US006738889B2

(12) United States Patent
Godtland et al.

(10) Patent No.: US 6,738,889 B2
(45) Date of Patent: May 18, 2004

(54) APPARATUS AND METHOD FOR PROVIDING SIMULTANEOUS LOCAL AND GLOBAL ADDRESSING WITH HARDWARE ADDRESS TRANSLATION

(75) Inventors: Paul LuVerne Godtland, Rochester, MN (US); George David Timms, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/352,001

(22) Filed: Jul. 12, 1999

(65) Prior Publication Data

US 2002/0042868 A1 Apr. 11, 2002

(51) Int. Cl.[7] .............................................. G06F 12/00
(52) U.S. Cl. ........................ 711/209; 711/205; 709/226
(58) Field of Search ................................ 711/202, 203, 711/205–209, 226

(56) References Cited

U.S. PATENT DOCUMENTS

| | | | | |
|---|---|---|---|---|
| 4,691,281 A | * | 9/1987 | Furui | 711/207 |
| 4,774,659 A | * | 9/1988 | Smith et al. | 364/200 |
| 5,560,029 A | * | 9/1996 | Papadopoulos et al. | 712/25 |
| 5,581,765 A | | 12/1996 | Munroe et al. | 395/677 |
| 5,729,714 A | * | 3/1998 | Dei | 711/147 |
| 5,862,357 A | * | 1/1999 | Hagersten et al. | 395/309 |
| 5,960,465 A | * | 9/1999 | Adams | 711/208 |
| 6,026,475 A | * | 2/2000 | Woodman | 711/202 |
| 6,119,198 A | * | 9/2000 | Fromm | 711/5 |
| 6,496,864 B1 | * | 12/2002 | McCartney | 709/226 |

OTHER PUBLICATIONS

Pending patent application, Munroe et al., "Computer System Having Shared Address Space Among Multiple Virtual Address Spaces", Ser. No. 08/771,550, filed Dec. 23, 1996.

IBM System/38 Technical Developments manual, p. 1–110, (1978).

Chase et al., "Some Issues for Single Address Space Systems", Dept. of Computer Science and Eng., FR-35, Univ. of Washington.

Chase et al., "Opal: A Single Address Space System for 64-bit Architectures", Dept. of Computer Science and Eng., Univ. of Washington.

* cited by examiner

Primary Examiner—Matthew Kim
Assistant Examiner—Pierre M. Vital
(74) Attorney, Agent, or Firm—Martin & Associates, LLC; Derek P. Martin

(57) ABSTRACT

An apparatus and method provide simultaneous local and global addressing capabilities. A global address space is defined that may be accessed by all processes. In addition, each process has a local address space that is local (and therefore available) only to that process. An address translation mechanism is implemented, preferably in hardware, to compare an address to defined addresses for local and global addressing and to detect when a virtual address computation result would go outside a boundary for the appropriate addressing scheme. The address translation mechanism maps a virtual address to a corresponding physical address, and uses different criteria depending on whether the address is local or global. The address translation mechanism allows an instruction to operate on both local and global addresses by determining at run-time which address space is referenced, and by performing the necessary translation and boundary checking for either global or local address space, whichever is accessed by the instruction. By providing both global and local addressing for the same instructions, the apparatus and method of the present invention provide great flexibility in addressing, allowing a computer program to benefit from the advantages of both addressing modes.

10 Claims, 6 Drawing Sheets

LOCAL ADDRESSING  PRIOR ART

GLOBAL ADDRESSING  PRIOR ART

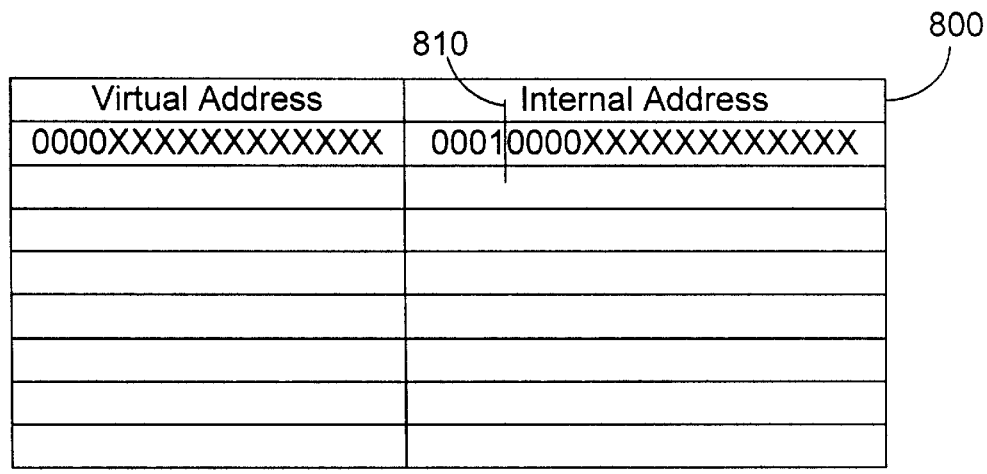
FIG. 8
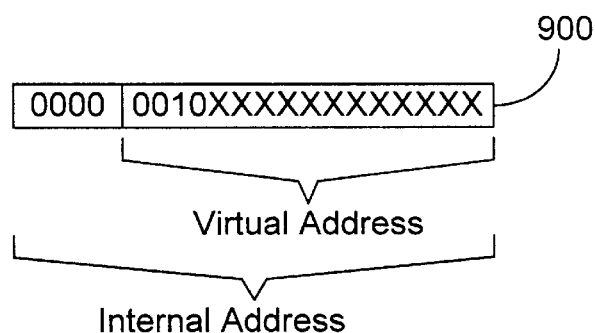
FIG. 9
load RegL, anyDisp(anyReg)
load RegM, anyDisp(anyReg)
. . .
Start of loop
load RegY, Disp1(RegL) ——— 1002
load RegZ, Disp2(RegM) ——— 1004
. . .
Use value from RegY to load data values and then perform computations
Use value from RegZ to load data values and then perform computations
. . .
add 8 (length of an address) to RegL
add 8 (length of an address) to RegM
Test for end of loop
Branch to Start of loop if not done
FIG. 10

APPARATUS AND METHOD FOR PROVIDING SIMULTANEOUS LOCAL AND GLOBAL ADDRESSING WITH HARDWARE ADDRESS TRANSLATION

BACKGROUND OF THE INVENTION

1. Technical Field

The present invention relates in general to the data processing field. More specifically, the present invention relates to the field of addressing schemes in computer systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems have addressing capabilities that are defined by the computer hardware. The address space of a computer system is the range of addresses available to reference data, instructions, etc., and is determined by the size (in bits) of the address. The address size is one of the fundamental architectural features of a computer system. Early computer systems were single-user computers that could handle only a single task at a time, mapping all data into a single address space, and swapping data into and out of the address space whenever a new task needed to be performed. Later, computers were developed that supported multiple users and processes. A computer system that supports multiple processes must manage the allocation of the address space among the different processes. Because the addresses needed for all the processes that might run on a computer system typically exceeds the physical address space defined by the address, a separate address space is typically allocated to each process, resulting in multiple virtual address spaces. This type of addressing is known as "local addressing", because each process has its own virtual address space that is local to the process, and cannot be seen by other processes.

In a local addressing scheme, having multiple virtual address spaces mapped onto a physical (real) address space may very well result in a physical address being mapped to the same virtual address in different processes. When a process is loaded into main memory, a mapping mechanism maps virtual addresses in the virtual address space of the process to physical addresses in the main memory of the computer system. This mapping function increased the complexity of the operating system that had to perform the virtual address mapping, but was required to allow multiple virtual address spaces to exist that are collectively larger than the physical address space.

An alternative addressing scheme to local addressing is known as "global addressing", where one address space is used that is sufficiently large that it can be divided up among processes without overlapping between them. Each process is allocated a unique portion of the large global address space. The benefit of a global addressing scheme is that programs and data in a computer system can be assigned persistent, unique logical addresses in the large system address space. Because these logical addresses are not duplicated, they can be used to identify data either in main memory or in secondary memory, such as on a hard disk drive. For this reason, the global addressing scheme is sometimes referred to as a "single level store" architecture. Examples of computer systems that use global addressing schemes are the IBM System/38 computer system formerly manufactured and distributed by IBM Corporation, the IBM AS/400 computer system currently manufactured and distributed by IBM, and the Opal system developed at the University of Washington. For additional background concerning the IBM System/38 and IBM AS/400 system, see IBM System/38 Technical Developments (IBM, 1978); IBM Application System/400 Technology (IBM, 1988); and IBM Application System/400 Technology Journal, Version 2 (IBM, 1992). The Opal system is described in a series of academic papers, including J. Chase et al., "Opal: A Single Address Space System for 64-bit Architectures", Proc. IEEE Workshop on Workstation Operating Systems (April 1992).

Current IBM AS/400 computer systems can operate in different modes. When an AS/400 system is operating in AS/400 mode, it operates with a single level store (i.e., global addressing). When an AS/400 system is operating in RS/6000 mode, it operates with multiple virtual address spaces (i.e., local addressing). While the AS/400 system supports either of these addressing schemes, it currently does not support both of them at the same time. Once the mode is set, the addressing scheme is set until the mode is changed at a later time. Without an apparatus and method for providing simultaneous local and global addressing, the computer industry will continue to suffer from the requirement of selecting either local or global addressing to the exclusion of the other.

DISCLOSURE OF INVENTION

According to the present invention, an apparatus and method provide simultaneous local and global addressing capabilities. A global address space is defined that may be accessed by all processes. In addition, each process has a local address space that is local (and therefore available) only to that process. An address translation mechanism is implemented, preferably in hardware, to compare an address to defined addresses for local and global addressing and to detect when a virtual address computation result would go outside a boundary for the appropriate addressing scheme. The address translation mechanism maps a virtual address to a corresponding physical address, and uses different criteria depending on whether the address is local or global. The address translation mechanism allows an instruction to operate on both local and global addresses by determining at run-time which address space is referenced, and by performing the necessary translation and boundary checking for either global or local address space, whichever is accessed by the instruction. By providing both global and local addressing for the same instructions, the apparatus and method of the present invention provide great flexibility in addressing, allowing a computer program to benefit from the advantages of both addressing modes.

The foregoing and other features and advantages of the invention will be apparent from the following more particular description of preferred embodiments of the invention, as illustrated in the accompanying drawings.

BRIEF DESCRIPTION OF DRAWINGS

FIG. 8 is a block diagram showing a segment table as one suitable implementation of a mechanism for performing step 750 of FIG. 7 that translates a virtual address to an internal address using local address translation criteria in accordance with the preferred embodiments;

FIG. 9 is a block diagram showing a method of prepending zeros to a virtual address to generate a suitable internal address as one suitable implementation of a mechanism for performing step 760 of FIG. 7 that translates a virtual address to an internal address using global address translation criteria in accordance with the preferred embodiments; and FIG. 10 is a diagram that shows pseudo-code for illustrating the simultaneous local and global address translation of the preferred embodiments.

BEST MODE FOR CARRYING OUT THE INVENTION

Overview

Figure 1:
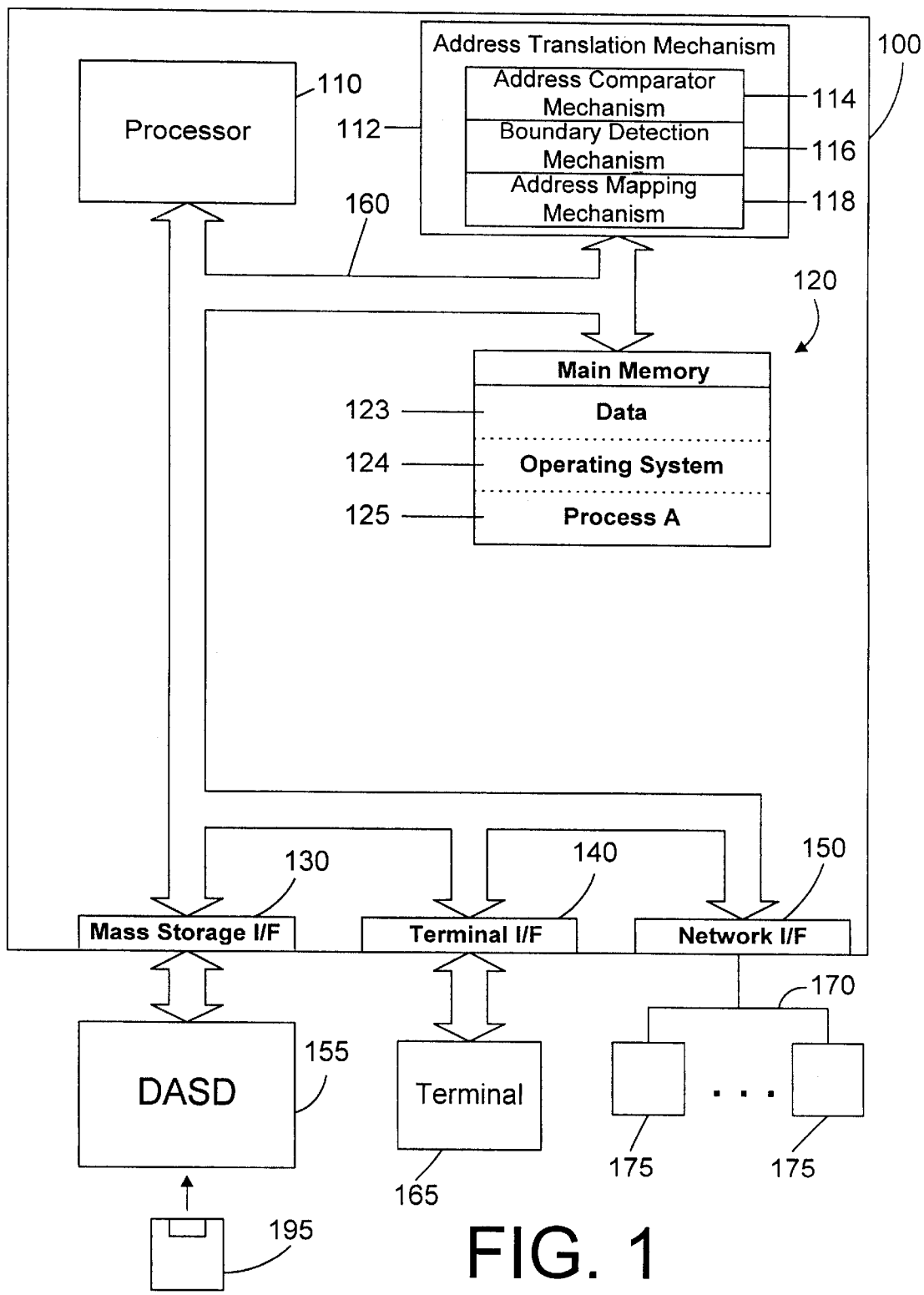
FIG. 1 is a block diagram of a computer apparatus in accordance with preferred embodiments of the present invention.

The present invention simultaneously provides local and global addressing in a single computer system. For those who are not familiar with the general concepts of local and global addressing and their advantages and disadvantages, these two addressing schemes are discussed in more detail below, along with definitions used herein.

Definitions

In discussing addressing modes, the same terms have been used in the art to represent different things to different people. For example, the term "virtual address" as most commonly known in the art refers to an address that may be accessed or that is derived by performing an address calculation, and that is visible to, and can be manipulated by, an executing program. However, this type of virtual address is referred to as an "effective address" in PowerPC terminology. A "virtual address" in PowerPC terminology is an address that is generated from an effective address and that is used internally in the PowerPC address translation scheme. This type of address is referred to herein as an "internal address" to indicate that this address is not visible to the programmer, but is an address that is generated and used by the address translation mechanism. A "real address" in PowerPC terminology is an address that is used to access real (or physical) memory, and is referred to herein as a "physical address". Generally speaking, for the discussion herein, an instruction accesses a virtual address, which is translated to an internal address, which is further translated to a physical address, as discussed in more detail below.

Local Addressing

Local addressing is the prevailing addressing paradigm in today's computer systems. Typically, each process has an address range that is the same for all processes. Address to data mappings are local to each process even though each process has the same address range. Data must be mapped into a process address space in order to be accessible, so data that will be accessed by more than one process must be mapped for each process that will use it. Whenever the processor switches between threads of execution in different processes, the address translation structures that convert from virtual to physical addresses must be managed. For example, the set of local mappings between virtual and physical addresses must be switched, and any hardware facility that speeds up address translation, such as a lookaside buffer, must have its entries invalidated. Otherwise, since the addresses for each process look the same as each other, the speed up facility could map an address to the wrong physical memory, which would produce the wrong data. Next, any address translation speedup facility must be primed with the known mappings for the new process, or else this facility will have to be filled as necessary with the new mappings. This lookaside buffer "miss" processing can slow down performance even more than the priming, yet if priming is done, each address space switch suffers its costs, even though many of the address translation entries may not be used before the next switch to a different local address space. In summary, extra work occurs for local addressing paradigms to share data and/or share the hardware facilities involved in address translation for accessing data.

Global Addressing

Global addressing is a wholly different paradigm than local addressing. The IBM AS/400 computer is a very popular computer system that uses global addressing. In a global addressing scheme, all processes share the same address space. Address to data mappings are global and may persist beyond the life of the process. This means that when the processor switches between threads of execution, there is no need to change mappings so there is no extra overhead associated with managing address translation facilities. Further, if the mapping from address to data is persistent, at a higher logical level addresses can be used directly as identifiers, to refer to objects (chunks of data with defined allowable operations) without the need to use some lookup facility like a table to map between an identifier and an object. On the other hand, a means must exist to control use of global addresses, to prevent all programs from accessing any data. This requires a system structure that can either control generation of global addresses or can check rights for all accesses to data. On the AS/400 computer system, the system structure ensures that executable code (and so generation of global addresses by code) is generated by a system component. This special code generator must insert hardware instructions to validate addresses—instructions that would not be necessary in a purely local addressing paradigm. In addition, global addressing necessarily imposes limitations on the number of objects that can be addressed over time and on the maximum size of any object, because of the fundamental computer implementation and architecture needs to limit address size. Further, the key advantage of global accessibility of data actually inhibits or complicates some data uses that are inherently local. Also, global addressing provides for only one view of data accessibility from a hardware perspective. That is, different processes running with the same security privileges cannot have different storage protection characteristics for the same data in a purely global paradigm.

Detailed Description

According to preferred embodiments of the present invention, an apparatus and method allow simultaneous local and global addressing in a computer system. An address translation mechanism preferably implemented in hardware determines whether an address is a local address or a global address, performs checks to assure that address calculations are within the boundaries defined for their addressing type (local or global), and generates the mapping to physical addresses to access the desired data.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 123, an operating system 124, and one or more processes 125. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 123, operating system 124, and process 125, are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 123 represents any data that serves as input to or output from any program in computer system 100. Operating system 124 is a multitasking operating system known in the industry as OS/400; however, those skilled in the art will appreciate that the spirit and scope of the present invention is not limited to any one operating system. Process 125 is made up of program instructions that are executed by processor 110, along with related data structures.

An address translation mechanism 112 is a mechanism that provides the ability to access both global and local address spaces according to the preferred embodiments. Address translation mechanism 112 includes an address comparator mechanism 114, a boundary detection mechanism 116, and an address mapping mechanism 118. Address comparator mechanism 114 detects whether the base (starting) address for a virtual address computation is defined as a global address or as a local address. Boundary detection mechanism 116 determines whether any address computations used to reference memory span outside of the boundaries defined by the addressing mode (global or local). Address mapping mechanism 118 maps a virtual address to a physical address using different translation criteria for local addresses than used for global addresses.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figure 2:
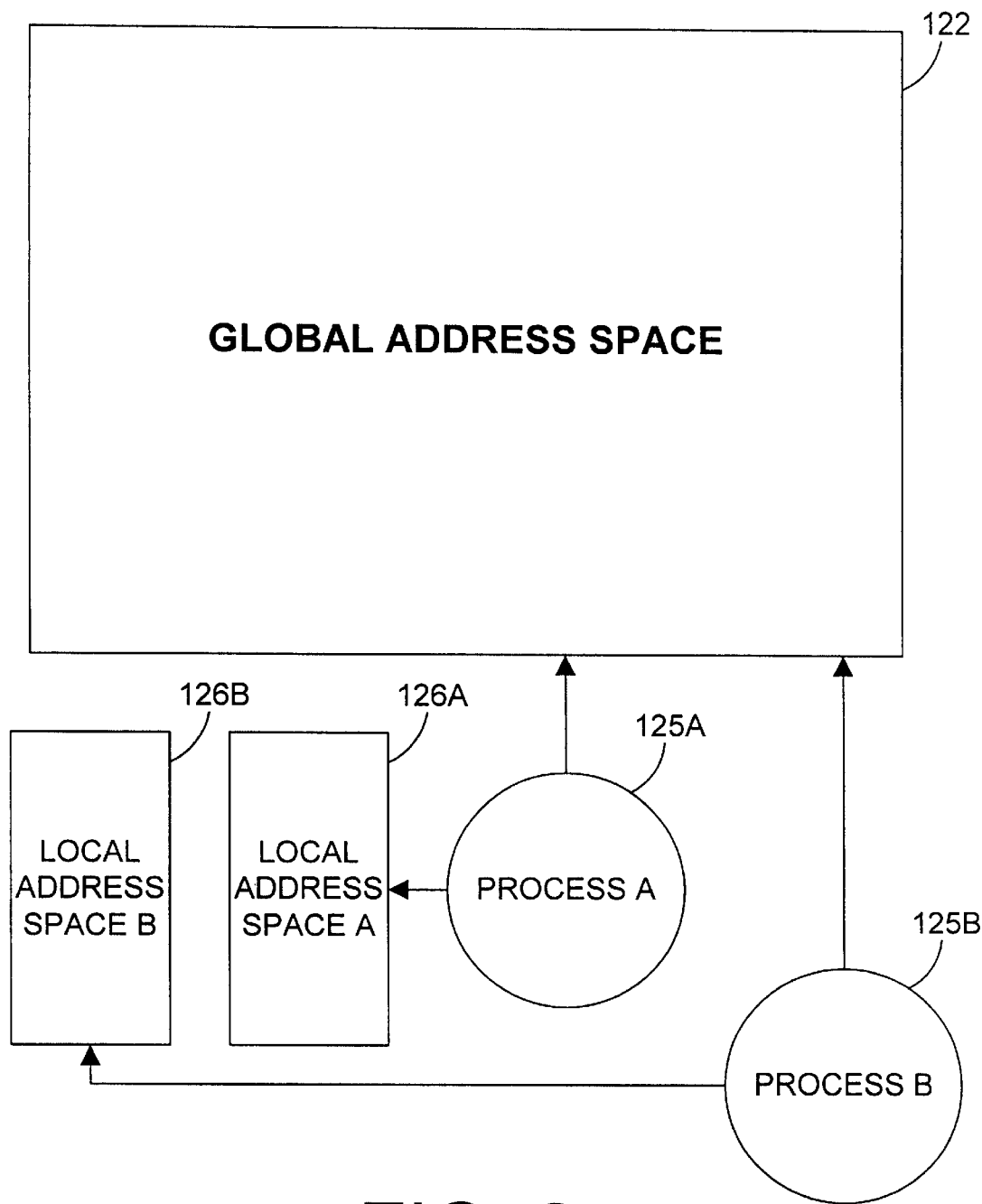
FIG. 2 is a block diagram showing how different processes can access both local and global address space in accordance with the preferred embodiments.

Referring to FIG. 2, a block diagram illustrates how different processes in the preferred embodiments can access a common global address space while at the same time accessing a dedicated local address space as well. Note that the address spaces in FIG. 2 could be mapped to occupy any portion of the full address space defined by processor 110. Process A 125A can access global address space 122, and can also access its local address space 126A. Similarly, process B 125B can access global address space 122, and can also access its local address space 126B. In the preferred embodiments, each process has its own corresponding local address space. Each process is able to access both global address space 122 and its corresponding local address space 126 without using any special instructions or compiler directives to set or determine the addressing mode. The addressing mode is determined dynamically as an instruction is executed by an address translation mechanism 112 that is preferably implemented in hardware. Of course, some or all of the function of address translation mechanism 112 could be implemented in software as well, such as within operating system 124, or within microcode instructions.

Figure 3:
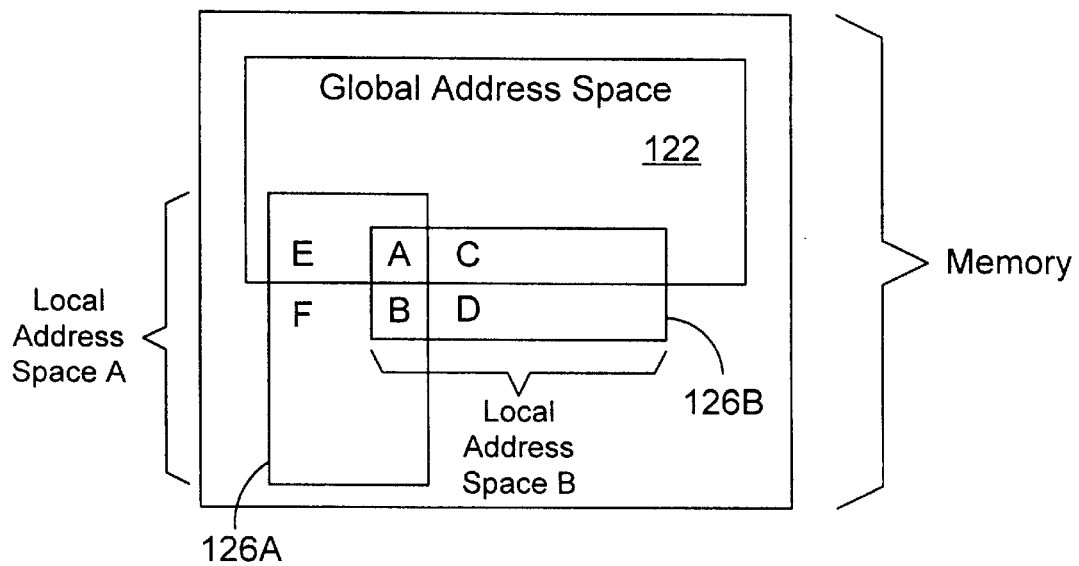
FIG. 3 is a block diagram showing how different processes can access the same or different memory in accordance with the preferred embodiments.

FIG. 2 is shown to conceptually distinguish between global and local address spaces, and to graphically illustrate that a process can access both global and local address spaces. FIG. 3 illustrates how the address spaces in FIG. 2 might map to memory. Note that the term "memory" includes any device that is mapped to an address that is accessible to processor 110 of FIG. 1, including main memory 120, direct access storage device 155, network interface 150, etc. Global address space 122 defines a block of addresses that access a portion of memory defined by the box labeled "Global Address Space" in FIG. 3. Virtual address space A 126A defines a block of addresses that access a portion of memory defined by the box labeled "Local Address Space A" and "126A" in FIG. 3. Virtual address space B 126B defines a block of addresses that access a portion of memory defined by the box labeled "Local Address Space B" and "126B" in FIG. 3.

The areas labeled with letters in FIG. 3 may be accessed from one or more address spaces, as discussed below. Some of the same locations in memory may be accessed using different addresses. For example, the memory in the region labeled "A" can be accessed using a global address in global address space 122, using a local address in local address space A 126A, or using a local address in local address space B 126B. Region A is the intersection of these three defined addressing spaces, and defines a common region of memory that may be accessed from any of these three address spaces. Region B of memory may be accessed using a local address in local address space A 126A, or using a local address in local address space B 126B, but cannot be accessed using a global address in global address space 122. Region C of memory may be accessed using a global address in global address space 122, or using a local address in local address space B 126B, but cannot be accessed using a local address in local address space A 126A. Region D of memory can be accessed using a local address in local address space B 126B, but cannot be accessed using a global address in global address space 122 or using a local address in local address space A 126A.

Region E of memory may be accessed using a global address in global address space 122, or using a local address in local address space A 126A, but cannot be accessed using a local address in local address space B 126B. Region F of memory can be accessed using a local address in local address space A 126A, but cannot be accessed using a global address in global address space 122 or using a local address in local address space B 126B. In addition, it is possible to map multiple address ranges in a local address space to a single area of memory.

Figure 4:
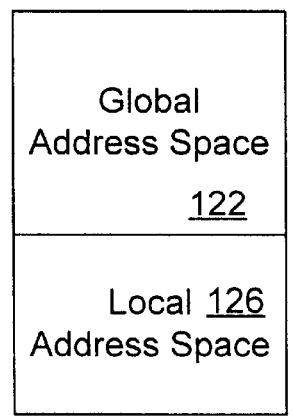
FIG. 4 is a block diagram showing a logical view of memory available to a process.

While the mappings of memory to address spaces is shown in FIG. 3, a logical view of available address spaces for a given process is shown in FIG. 4. We assume for this example that a process may access global address space 122 as well as its own local address space 126. Each process in a system would therefore preferably have access to both the global address space 122 and a local address space 126, as shown in FIG. 4. Note, however, that is equally within the scope of the preferred embodiments to provide processes that access only global address space 122 or only their own local address space 126. In addition, it is within the scope of the preferred embodiments to provide multiple local address spaces for a process, and a process can therefore address any combination of global and local address spaces.

Figure 5:
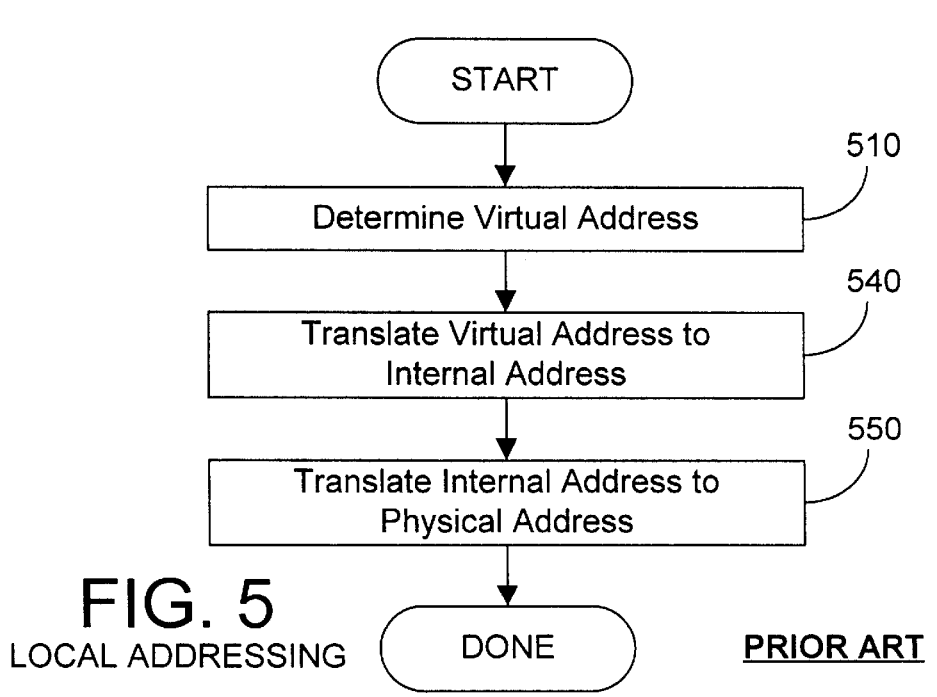
FIG. 5 is a flow diagram showing a prior art method for mapping a virtual address to a physical address in a local addressing scheme.

To best understand the preferred embodiments of the invention, the prior art methods for performing local and global addressing are first considered. Referring to FIG. 5, a method 500 for performing local addressing in accordance with known addressing techniques begins by determining a virtual address (step 510), then translates the virtual address to an internal address (step 540). One known method of translating a virtual address to an internal address uses a segment table that pairs a virtual address to its corresponding internal address. Once the virtual address has been translated to an internal address, the internal address is then translated to a physical address (step 550). One known method of translating an internal address to a physical address uses a page table that pairs an internal address to its corresponding physical address. This method 500 effectively maps a virtual address to a corresponding physical address in a computer system that has only local addressing.

Figure 6:
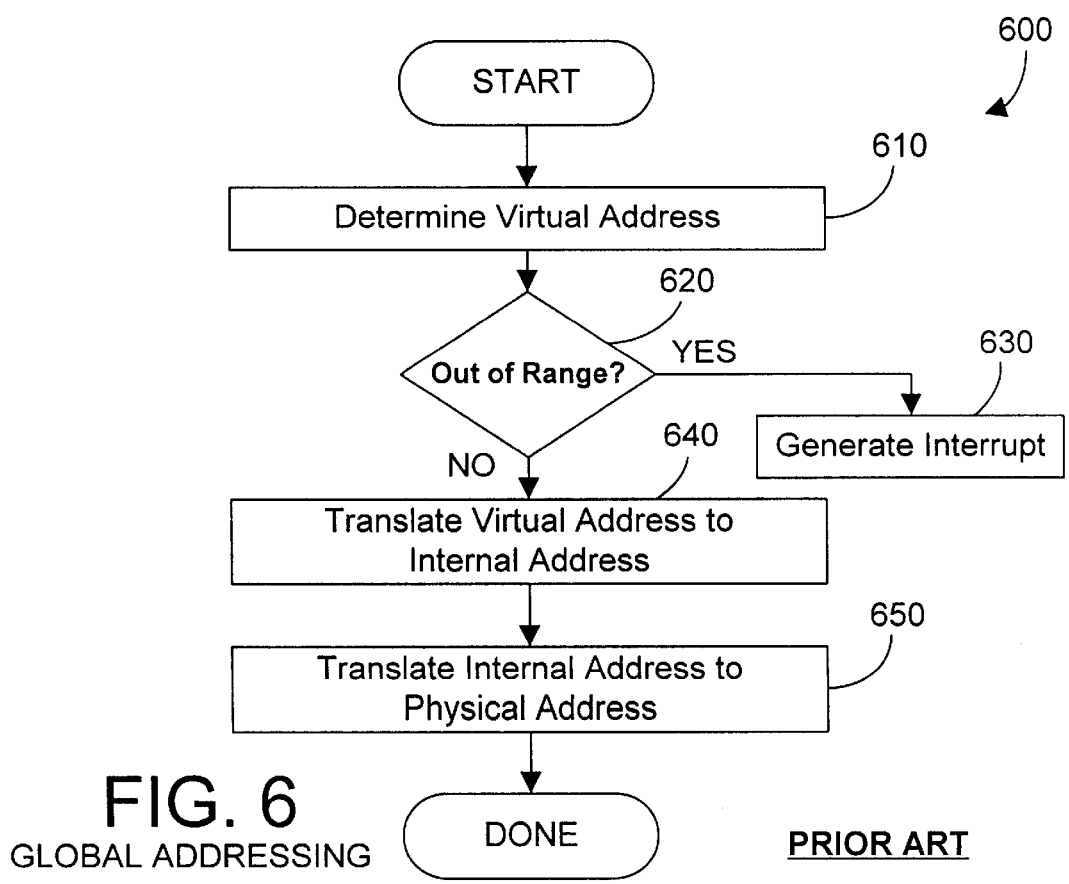
FIG. 6 is a flow diagram showing a prior art method for mapping a virtual address to a physical address in a global addressing scheme.

Referring to FIG. 6, a prior art method 600 for performing global addressing begins by determining the virtual address (step 610). The virtual address in step 610 may be a fixed address, or may be an address that is derived by performing some address computation. Next, method 600 determines whether the virtual address is out of range (step 620). A virtual address is out of range if it spans beyond a segment (subdivision) boundary defined within global addresses. To determine whether a virtual address is out of range, the base address plus displacement plus length of the data being accessed are added together, and the result is compared to a boundary for the virtual address. Note that boundaries can define subdivisions in the global address space. If the virtual address is out of range (step 620=YES), an interrupt is generated (step 630) to indicate that the address was out of range. If the address is not out of range (step 620=NO), the virtual address is translated to an internal address (step 640), and the internal address is then translated to a physical address (step 650).

Figure 7:
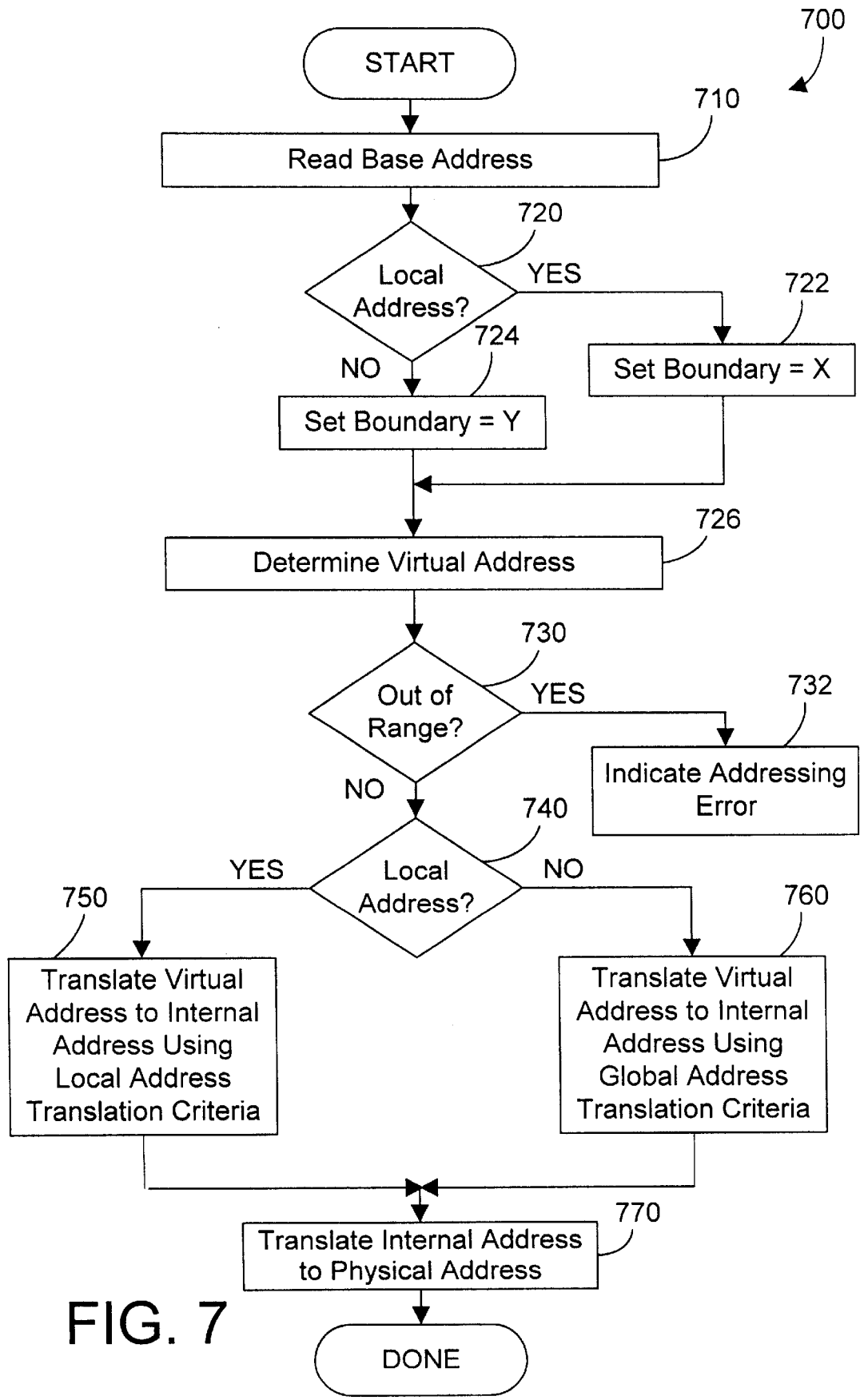
FIG. 7 is a flow diagram showing a method for providing simultaneous local and global addressing capability in accordance with the preferred embodiments.

Referring now to FIG. 7, a method 700 for providing simultaneous global and local addressing in accordance with the preferred embodiments begins by reading the base virtual address (step 710). The base address is preferably defined by the contents of a "base" register that is the starting address for a virtual address computation. A virtual address preferably has one or more values that indicate a local address, and one or more values that indicate a global address. If the base address indicates a local address (step 720=YES), a boundary is set (step 722) to a value that corresponds to the boundary for a local address space. If the base address indicates a global address (step 720=NO), the boundary is set (step 724) to a value that corresponds to the boundary or boundaries for all or part of the global address space. Note that one or more boundaries can be defined, and that the size of segments defined by the boundaries can vary. The virtual address is then determined (step 726), preferably by adding a base virtual address to a displacement and to a data access size to arrive at a computed virtual address. The result is analyzed to determine whether it is out of range by looking at the boundary value that was set in step 722 or step 724. If the computed virtual address is out of range (step 730=YES), an addressing error is indicated (step 732) to indicate an address out of range condition. Two suitable ways of indicating an addressing error include generating a hardware interrupt or returning a predefined specific value that indicates an addressing error, but any suitable way of indicating an addressing error is within the scope of the preferred embodiments. If the computed virtual address is not out of range (step 730=NO), method 700 then determines whether the computed virtual address is local or global (step 740). In the preferred embodiment, step 740 determines whether the virtual address is local or global, similar to step 720. If the virtual address is local (step 740=YES), the virtual address is translated to an internal address using local address translation criteria (step 750). One suitable way of performing the local address translation in step 750 is to provide a segment table 800 that pairs virtual addresses with their corresponding internal addresses, as shown in FIG. 8. For the specific example in FIG. 8, the virtual address has two bytes (i.e., four hexadecimal digits) that are prepended to the virtual address to arrive at the internal address, as shown by the four hexadecimal digits to the left of line 810. The X's in the virtual address and internal address denote "don't care" hexadecimal digits, as is common in the art. The portion of the internal address to the right of line 810 is simply the virtual address in the left column. Note that any suitable mapping method from virtual address to internal address is within the scope of the preferred embodiments. If the address is global (step 740=NO), the virtual address is translated to an internal address using global address translation criteria (step 760). One suitable way of performing the global address translation in step 760 is to prepend zeros before the virtual address to derive an internal address 900, as shown in FIG. 9. Once an internal address is derived in step 750 or step 760, the internal address is translated to a physical address (step 770). One suitable way of performing the address translation in step 770 is to provide a page table that pairs internal addresses with their corresponding physical addresses. Once the physical address is derived in step 770, the physical memory may be accessed to store or retrieve data.

The steps in method 700 of FIG. 7 do not imply a necessary order to performing those steps. Many of these steps and sequences of steps may be performed in parallel. For example, steps 710 through 730 could be performed in parallel to steps 740–760. Of course, other combinations of parallel steps are also possible, and the preferred embodiments expressly extends to any ordering for performing the steps of method 700. In addition, some of the steps in method 700 may not need to be performed. For example, if the global address space is uniform and not subdivided into segments, the setting of boundaries and checking for out of range in steps 720 through 730 may not be needed.

The flow diagrams of FIGS. 5–7 assume that the computation of a virtual address is performed as part of the address translation. One might argue that the computation of the virtual address is performed before the actual translation of the virtual address to a physical address. The representations in FIGS. 5–7 are shown for the purpose of illustrating the salient steps that are required to compute a virtual address and to generate from that virtual address a physical address for accessing physical memory, regardless of where one draws the dividing line that defines when address translation begins.

The principles of the present invention may be illustrated using an example of one suitable implementation in accordance with the preferred embodiments. Referring back to FIG. 1, we assume that computer system 100 of FIG. 1 is an AS/400 computer system that has a 64-bit processor 110. The global address space for processor 110 is $2^{64}$, which defines in excess of $1.8 \times 10^{19}$ addresses using eight bytes of address. We assume for this example that if the two most significant bytes of address are all zeros, the address is a local address. If the two most significant bytes are anything other than all zeros, the address is a global address. A local address space thus defines 256 terabytes of address space.

One suitable local address translation criterion uses a segment table that maps the eight byte virtual address to a ten byte internal address. One suitable global address translation criterion prepends two bytes of zeros to the virtual address to generate a ten byte internal address. The ten byte internal address is then mapped to a physical address.

Some significant advantages of providing local and global addressing through hardware translation according to the preferred embodiments are illustrated by considering the sample of pseudo-code in FIG. 10. This sample of code illustrates that the same set of instructions will process either local or global addresses in any combination. For example, in the first pass through the loop we assume the value in RegY in instruction 1002 is a global address and the value in RegZ in instruction 1004 is a local address. On the next iteration, RegY may contain a local address and RegZ a global address. Then both may contain local addresses, and then both may contain global addresses. The instructions that use RegY and RegZ to access memory thus do not depend on whether local or global addressing will be used. The same instructions can operate on either local or global addresses.

Some instructions can respond somewhat differently, depending upon whether they happen to be processing a global or a local address value. Specifically, those instructions that detect the calculation of a virtual address which overflows the bounds of a segment will check against different boundary values if the segment size differs between the local and global address spaces. Setting the different values depending on addressing mode is shown in steps 722 and 724 of FIG. 7, and checking against those values is shown in step 730 of FIG. 7. For the specific AS/400 system described above, the segment size for local address space is 256 terabytes, while the segment size within the global address space is 16 megabytes. Note, however, that it is equally within the scope of the preferred embodiments to provide different segment sizes within local and/or within global address spaces.

By providing both local and global addressing capabilities at the same time, the flexibility of a computer system implemented in accordance with the preferred embodiments is greatly increased. Such a system with dual addressing capabilities enjoys the benefits of both addressing schemes while minimizing the drawbacks. If data needs to be available to other processes, it can be stored in global address space and can then be accessed without the overhead of a local addressing scheme. If data is local to a process, it can be mapped to and addressed in local address space without having to perform address validation or authorization checking, which would be required in a purely global addressing scheme.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus comprising:
   (1) at least one processor;
   (2) a memory coupled to the at least one processor;
   (3) a first process residing in the memory and executed by the at least one processor;

(4) a virtual address space that is addressable by at least one instruction executed by the at least one processor, the virtual address space comprising:
  (4a) a global address space partition that may be accessed by any process executed by the at least one processor, including the first process; and
  (4b) a local address space partition that may be accessed only by the first process; an
(5) a hardware address translation mechanism coupled to the at least one processor that:
  (5a) detects whether a virtual address referenced by the at least one instruction accesses the global address space, and if so, maps the virtual address to an internal address sing at least one global address translation criterion, and that maps the internal a dress to a corresponding physical address; and
  (5b) detects whether a virtual address referenced by the at least one processor accesses the local address space, and if so, maps the virtual address to an internal address sing at least one local address translation criterion, and that maps the internal a dress to a corresponding physical address.

2. The apparatus of claim 1 wherein the address translation mechanism further comprises a bound detection mechanism that detects when a virtual address that accesses the global address space is outside of a predefined boundary for the global address space.

3. The apparatus of claim 1 wherein the address translation mechanism further comprises a boundary detection mechanism that detects when a virtual address that accesses the local address space is outside of a predefined boundary for the local address space.

4. An address translation apparatus comprising:
  (1) a hardware address comparator mechanism that detects whether a virtual address accesses a global address pace partition within a virtual address space and that detects whether a virtual address accesses a local address space partition within the virtual address space, wherein the global address space may be accessed by any process, while the local address space can only be accessed by a single process;
  (2) a hardware boundary detection mechanism that detects when a virtual address that accesses the global address space partition is outside of a predefined boundary for the global address space partition and that detects when a virtual address that accesses the local address space partition is outside of a predefined boundary for the local address space partition;
  (3) a hardware address mapping mechanism that maps the virtual address to an internal address using at least one global address translation criterion, and that maps the internal address to a corresponding physical address if the virtual address corresponds to a global address and that maps the virtual address to an internal address using at least one local address translation criterion, and that maps the internal address to a corresponding physical address if the virtual address corresponds to a local address.

5. A method for translating both local and global addresses to a physical address, the method comprising steps of:
  (A) determining in hardware whether a virtual address corresponds to a local address by detecting when the virtual address accesses a local address space partition within a virtual address space, wherein the local address space partition may be accessed only by a single process;
  (B) determining in hardware whether the virtual address corresponds to a global address by detecting when the virtual address accesses a global address space partition within the virtual address space, wherein the global address space partition may be accessed by any process;
  (C) if the virtual a dress corresponds to a local address:
    (C1) translating the virtual address to an internal address using at least one local address translation criterion; and
    (C2) translating the internal address to a corresponding physical address;
  (D) if the virtual address corresponds to a global address:
    (D1) translating the virtual address to an internal address using at least one global address translation criterion; and
    (D2) translating the internal address to a corresponding physical address.

6. The method of claim 5 further comprising the step of determining whether the virtual address is out of range, and if so, indicating an addressing error.

7. The method of claim 6 wherein the step of indicating an addressing error comprises the step of generating a hardware interrupt.

8. The method of claim 6 wherein the step of indicating an addressing error comprises the step of returning a predefined specific value that indicates an addressing error.

9. The method of claim 5 further comprising the step of setting a first boundary for the virtual a dress if the virtual address is a local address and setting a second boundary for the virtual address if the virtual address is a global address.

10. A method for providing simultaneous local and global addressing on a computer system, the method comprising the steps of:
  reading a processor instruction that specifies a virtual address comprised of a base virtual address, a displacement, and a size of data access;
  determining whether the base virtual address addresses a local address partition in a virtual address space, wherein the local address partition may be accessed only by a single process;
  determining whether the base virtual address addresses a global address partition in the virtual address space, wherein the global address partition may be accessed by any process;
  if the virtual address addresses the local address partition, setting a first boundary for the virtual address;
  if the virtual address addresses the global address partition, setting a second boundary for the virtual address;
  computing the virtual address by adding the displacement and the size of data access to the base virtual a dress;
  determining whether the computed virtual address is out of range by comparing the computed virtual address to one of the first and second boundaries that correspond to the virtual address;
  determining whether the virtual address addresses the local address partition;
  if the virtual address addresses the local address partition, translating the virtual address to an internal address using at least one local address translation criterion;
  if the virtual address addresses the global address partition, translating the virtual address to the internal address using at least one global address translation criterion; and
  translating the inter al address to a corresponding physical address.

* * * * *

UNITED STATES PATENT AND TRADEMARK OFFICE
CERTIFICATE OF CORRECTION

PATENT NO. : 6,738,889 B2
DATED : May 18, 2004
INVENTOR(S) : Paul LuVerne Godtland et al.

It is certified that error appears in the above-identified patent and that said Letters Patent is hereby corrected as shown below:

Column 11,
Lines 14 and 20, "sing" should be -- using --,
Line 21, "a dress" should be -- address --,
Line 36, "pace" should be -- space --, Column 12,
Lines 27 and 50, "a dress" should be -- address --.

Signed and Sealed this

Sixteenth Day of November, 2004

JON W. DUDAS
*Director of the United States Patent and Trademark Office*